Nov. 10, 1959 E. A. HORSLEY 2,912,122
COOLING SYSTEM FOR POWER COMPONENTS OF
TRAVELLING CRANES AND THE LIKE
Filed Oct. 3, 1956 2 Sheets-Sheet 1
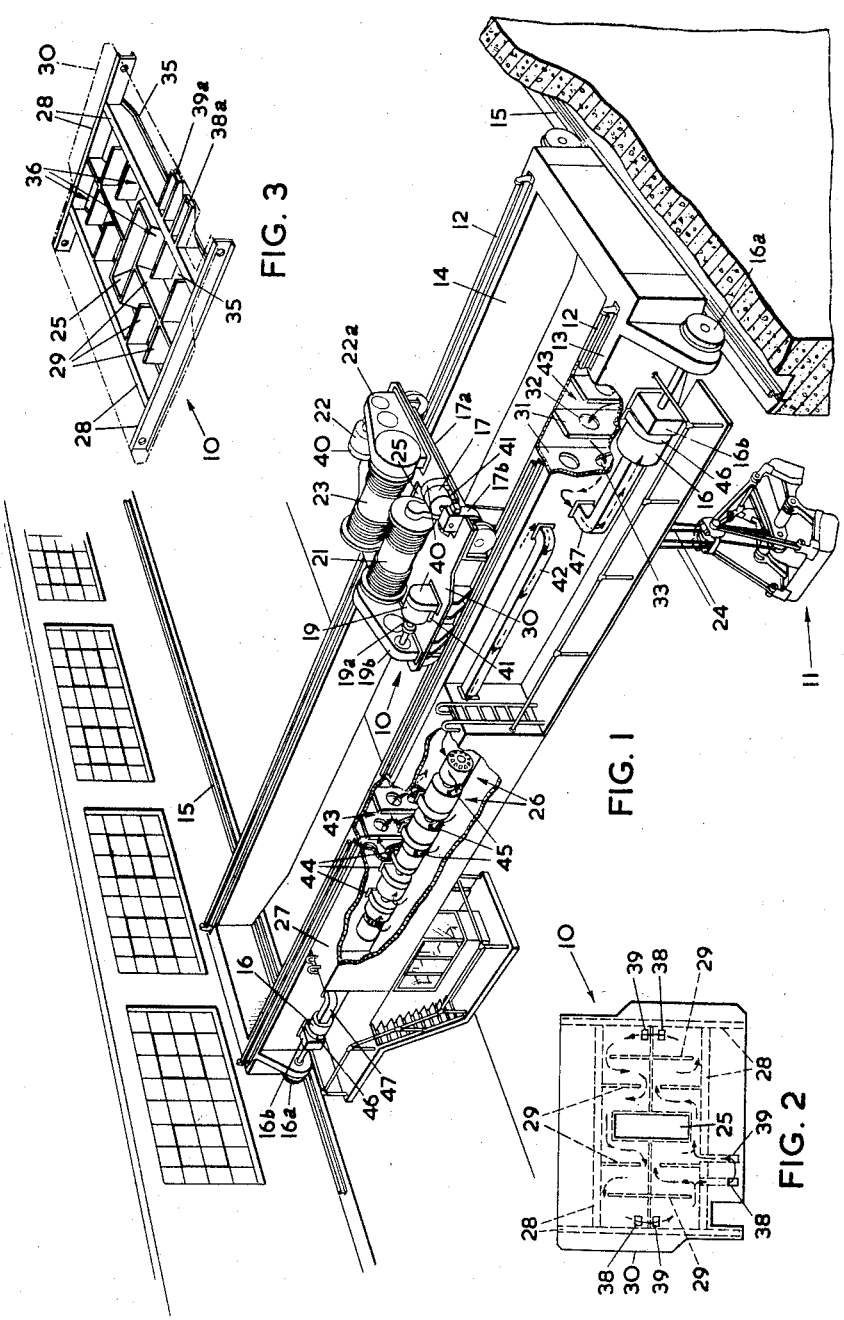
INVENTOR
EDWARD A. HORSLEY
BY: Maybee & Legris
ATTORNEYS Nov. 10, 1959     E. A. HORSLEY     2,912,122
COOLING SYSTEM FOR POWER COMPONENTS OF
TRAVELLING CRANES AND THE LIKE
Filed Oct. 3, 1956     2 Sheets-Sheet 2
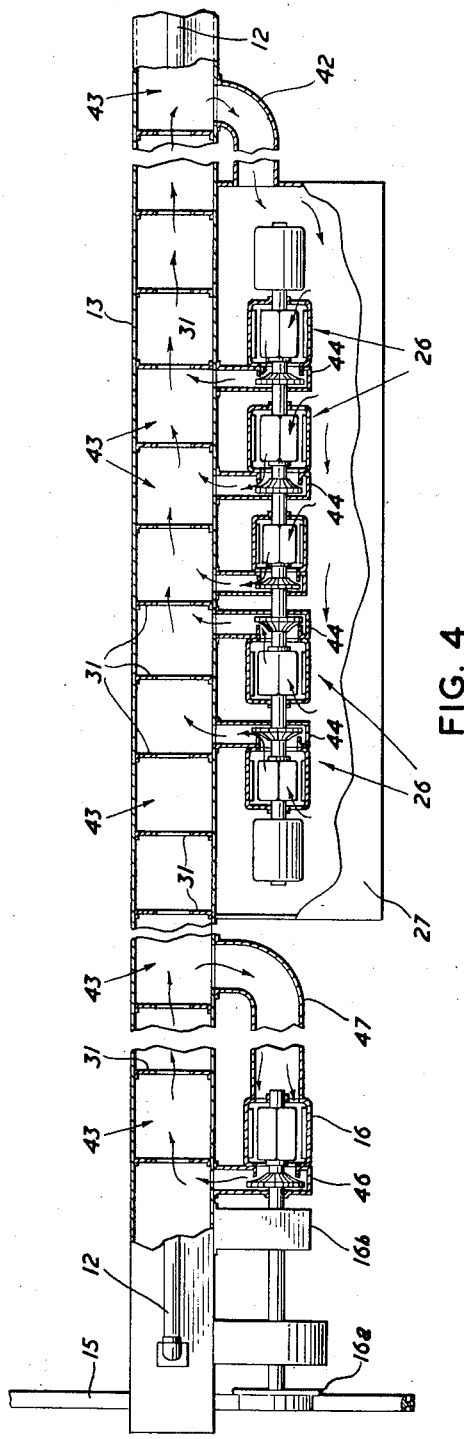
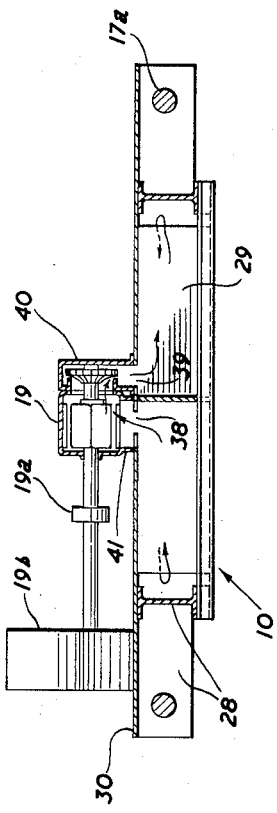
INVENTOR
EDWARD A. HORSLEY
BY: Maybee & Legris
ATTORNEYS

United States Patent Office 2,912,122
Patented Nov. 10, 1959

2,912,122

COOLING SYSTEM FOR POWER COMPONENTS OF TRAVELLING CRANES AND THE LIKE

Edward Alexander Horsley, Niagara Falls, Ontario, Canada, assignor to Provincial Engineering Ltd., Niagara Falls, Ontario, Canada, a corporation Application October 3, 1956, Serial No. 613,727

6 Claims. (Cl. 212—21)

This invention relates to means for cooling enclosed heat generating apparatus and is particularly concerned with cooling totally enclosed electrical motors and generators of travelling cranes.

Massive travelling cranes to which the invention may be applied may have a great dimension of more than a hundred feet and may weigh thousands of pounds. The electrical power components associated with such cranes should be reasonably small and at the same time have peak power capacities of the order of scores or hundreds of horsepower.

When working in a contaminated or dusty atmosphere, it is frequently necessary to seal heat generating electrical power components from the atmosphere, but problems of cooling the apparatus to prevent overheating are then encountered. Thus, electric motors and generators mounted on a crane must be totally enclosed when used in a dusty environment such as exists in a cement plant. Motors generally "burn out" rather than failing mechanically, and when they are totally enclosed from the surrounding atmosphere the problem of overheating becomes acute. The fans normally built into enclosed motors and generators to circulate the air confined within the motor and generator housings provide some convection, but since cooling by convection of atmospheric air through the motors and generators is not available, it has been necessary to increase the dimensions of motors and generators to increase the size of their heat radiating surfaces. Consequently, to obtain, say, a 160 horsepower output, it has been necessary to provide costly machines of such large physical dimensions that, under favorable cooling conditions, the machines could put out twice as much horsepower.

Furthermore, these massive electrical machines have great inertia, and in cranes which are subject to large intermittent loads braking of the machines is a problem. Where a large motor is used to open and close the jaws of a clamshell bucket suspended from the crane, the inertia of the motor may cause the jaws to bang together, creating noise and perhaps costly damage. For very heavy cranes, capable of handling 20-ton loads in a dusty atmosphere, it is doubtful whether a conventional totally enclosed motor having sufficiently large radiating surfaces and sufficiently small inertia can be designed to operate a clamshell bucket.

For all the foregoing reasons, it has long been apparent to those familiar with the design and manufacture of travelling cranes and similar heavy electrically powered non-stationary equipment that the provision of such equipment for use in dusty atmospheres and in other applications which necessitate total enclosure of the heat generating electrical power components necessarily involves considerable additional costs, both in original outlay and in maintenance expense. While the provision of supplementary cooling means has quite naturally suggested itself and has been long considered as a means of overcoming the problem of overheating, supplemental cooling means which have been proposed are either totally inapplicable to travelling cranes and similar non-stationary equipment or the cost of such supplemental cooling means outweighs any advantages or savings which are derived therefrom. For example, it has long been apparent that the provision of heat-exchange surfaces to dissipate heat into a foundation, as disclosed in U.S. Patent 953,574, is out of the question since the bridge and trolley of a travelling crane are translated with respect to each other and with respect to the building or fixed structure in which they are employed. Furthermore, from a cost standpoint, it is not feasible to provide heat exchange surfaces to dissipate heat to a remotely supplied circulated coolant, as disclosed in the same patent.

The general objects of the present invention are to provide means whereby the service life of enclosed power components employed on travelling cranes may be extended to approach the normal service life of such components in other applications and whereby the work capacity of such power components may be increased or the size thereof decreased, all at negligible cost. The invention makes it practical to design massive cranes of greater capacities than have heretofore been possible. For example, a 20-ton capacity travelling crane employing a clamshell bucket can easily be provided for operation in a dusty atmosphere.

These objects of the invention are achieved by providing means whereby trolleys, carriages, beams, girders, platforms and the like forming part of the usual structure of a travelling crane are used to provide large heat exchange surfaces, the arrangement and interrelation of the cooling system which is so formed being such that when a power component is under load, the heat exchange surfaces associated with it are swept on their heat-receiving sides with air circulated through the power component and are exposed on their heat-dissipating sides with outside, ambient air. With the crane in motion, the heat dissipating sides are exposed to the wiping action of the ambient air, so that greatest heat dissipation may be effected when it is most needed, namely when the power component is under load, substantial dissipation being effected by radiation and convection at other times.

Further objects and advantages of this invention will become apparent and the invention will be more clearly understood from the following description referring to the accompanying drawings, and the features of novelty which characterize this invention will be pointed out with particularity in the claims annexed to and forming a part of this specification.

Figure 1 is a perspective view of a travelling crane which embodies and illustrates the practice of the invention;

Figure 2 is a plan view of the body of the trolley shown in Figure 1;

Figure 3 is a perspective view of the trolley body shown in Figure 2, with the top deck removed;

Figure 4 is a plan view partly in section showing part of the crane bridge structure; and Figure 5 is a sectional view on a vertical plane through the trolley.

Referring to the drawings, the illustrated crane has a carriage or trolley, generally indicated at 10, from which a clamshell bucket 11 is suspended. The trolley 10 travels on rails 12, which are supported by large box girders 13 and 14. The girders 13 and 14 are fixed to each other at their ends and together form a crane bridge which travels laterally on stationary rails 15. The whole structure is propelled on the rails 15 by two motors 16 which are supported by the box girder 13 and which drive wheels 16a through gear boxes 16b. The trolley 10 is propelled longitudinally along the bridge by a motor 17 which is coupled to the drive axle 17a of the trolley through a gear box 17b. A hoist motor 19 is coupled through a brake 19a and gear box 19b to a closing drum 21, and a hoist motor 22 is similarly coupled through a brake and gear box 22a to a holding drum 23. The cables 24 which control the bucket depend from the drums 21 and 23 through a well 25.

Also supported by the box girder 13 are a plurality of motor-generator sets 26 which are associated with the several motors 16, 17, 19 and 22 to constitute wide speed range, high power capacity, Ward-Leonard motor control systems, which may be sensitively controlled, as is well known in the art.

The electrical power components are all enclosed within housings to protect them against the dusty atmosphere in which the equipment is to be used. In the particular crane which is illustrated, each of the motors 16, 17, 19 and 22 is encased in its own individual dustproof housing, as shown, while the power components 26 are enclosed in a common sealed housing 27.

The several trolley-carried elements 17–23 are supported on the trolley undercarriage or body which consists of a framework of beams 28 and ribs 29 to which is fixed an upper deck plate 30. The box girders are reinforced by internal stiffeners 31 which are provided with lightening holes 32 and crawl space apertures 33 (access being had to the interior of the girders by removable panels, not shown).

As so far described, the construction illustrated is typical of the massive travelling cranes conventionally provided for use in dusty atmospheres. According to the present invention, substantial advantages are realized by the provision of the additional relatively inexpensive modifications and features to be described below.

Each enclosed power component is vented to a large chamber formed within one of the massive structural components (the trolley or bridge) with which the power component is translated. Thus, the trolley body is provided with a lower deck or bottom plate 35 (Figure 3) which defines a chamber 36 compartmentalized by the ribs 29, the ribs acting as baffles and defining a serpentine path as indicated by the arrows in Figure 2. In the top trolley body deck plate 30 exhaust duct openings 38 and intake duct openings 39 are provided for the enclosed motors 17, 19 and 22, the duct openings for the motors 19 and 22 leading directly to the chamber 36 whereas the duct openings for the motor 17 lead through 38a, 39a to the chamber 36. The enclosed motors commonly include built-in motor fans 40, the intakes of the fans being connected to the intake duct openings and the motor housings communicating with the exhaust duct openings as at 41. If motors not having built-in fans are used, accessory fans can be added within the motor housings or elsewhere within the closed flow path defined within the housings and ducts and the chamber 36. As may be seen from the arrows in Figure 2, the circulation of air through the chamber 36 and the ducts and housings may be such that the fans supplement each other to promote circulation in the same direction. If one of the machines 17, 19 or 22 is working too hard it receives the benefit of relatively cooler air from the other machines.

The common housing 27 for the motor-generator sets 26 is provided with a duct 42 which extends a distance along the box girder 13 and then opens into the large chamber 43 defined by the walls of the girder 13. The motor-generator sets 26 commonly include built-in fans 44, as shown, having intakes directly from the chamber 43, the housings of the individual motors and generators having exhaust openings 45. Arrows in Figure 1 show the circulation of air or other cooling gas in a closed path from the motors and generators via the exhaust openings 45 into the housing 27, thence along the duct 42, into the girder 13, back along the girder to the intakes of the fans 44 and through the motors and generators again. The stiffeners 31 act as baffles, creating turbulence and therefore greater heat dissipation from the girder 13. If it is preferred to use machines not having built-in fans, a fan or blower may be placed within the duct 42 to maintain forced air circulation.

The housings for the motors 16 enclose fans 46, and ducts 47 lead from the motors 16 to the interior of the girder 13. Arrows on Figure 1 indicate the flow of air for the motor 16 nearest the observer. It will be seen that for any of the machines 16, 17, 19, 22 or 26 having built-in fans, the fan housings provide a portion of the required ducting for leading air to the machines.

The invention provides a simple solution to the long-existing problem of overheating of enclosed electrical machines, heretofore solved only partially by the use of large and therefore costly machines. By maintaining air circulation through the electrical power components and through the chambers 36 and 43 provided by the structural trolley and bridge components respectively of the crane while also closely relating in time the translation of the trolley and bridge with the peak loading of the electrical power components (which procedure is compatible with the efficient operation of travelling cranes), significant advantages may be realized at very little cost. At high-load periods, the walls of the hollow chambers 36 and 43 serve as heat exchange surfaces which are swept on their heat-receiving sides with air circulated through the power components and on their heat-dissipating sides with ambient coolant air, and relatively high heat dissipation is thus achieved, substantial dissipation by radiation and convection being maintained at other times. The large size of the massive structural components of the crane contributes greatly to the surprising effectiveness of the invention.

Modifications of this invention will occur to those skilled in the art and it is desired to be understood, therefore, that this invention is not to be limited to the particular embodiment disclosed, but that the appended claims are meant to cover all the modifications which are within the spirit and scope of this invention.

What I claim as my invention is:

1. In a massive electrically powered travelling crane for use in atmospheres from which the electrical power components of the crane must be sealed, a crane bridge supported for lateral translation and comprising box girders of hollow construction at least one of which defines a first sealed hollow chamber, a crane trolley straddling said box girders and supported for translation therealong and comprising a hollow trolley body which defines a second sealed hollow chamber, first power components carried by said one box girder, second power components carried by said hollow trolley body, first sealed housing means for said first power components, second sealed housing means for said second power components, first duct means between said first housing means and said first hollow chamber, said first housing means, hollow chamber and duct means defining at least one first closed and sealed path of circulation through said first housing means, through at least a substantial portion of said first hollow chamber and back through said first housing means, second duct means between said second housing means and said second hollow chamber, said second housing means, hollow chamber and duct means defining at least one second closed and sealed path of air circulation through said second housing means, through at least a substantial portion of said second hollow chamber and back through said second housing means, and blowing means within each of said closed paths of circulation for maintaining circulation of cooling gas therearound whereby the massive structure of said crane is utilized to provide heat exchange surfaces and the motion of the massive structure is utilized to increase the dissipation of heat through said surfaces to the exterior ambient atmosphere.

2. In a massive electrically powered travelling crane for use in atmospheres from which the electrical power components of the crane must be sealed, a crane bridge supported for lateral translation and comprising box girders of hollow construction at least one of which defines a first sealed hollow chamber divided by perforated stiffeners, a crane trolley straddling said box girders and supported for translation therealong and comprising a hollow trolley body which defines a second sealed hollow chamber divided by ribs defining a serpentine path through said second chamber, first power components carried by said at least one box girder, second power components carried by said hollow trolley body, first sealed housing means for said first power components, second sealed housing means for said second power components, first duct means between said first housing means and said first hollow chamber, said first housing means, hollow chamber and duct means defining at least one first closed path of circulation, sealed from exterior air, through said perforated stiffeners and along at least a substantial portion of said first hollow chamber and through said first housing means, second duct means between said second housing means and said second hollow chamber, said second housing means, hollow chamber and duct means defining at least one second closed path of circulation, sealed from exterior air, along said serpentine path through at least a substantial portion of said second hollow chamber and through said second housing means, and blowing means within each of said closed paths of circulation for maintaining circulation of cooling gas therearound whereby the massive structure of said crane is utilized to provide heat exchange surfaces and the motion of the massive structure is utilized to increase the dissipation of heat through said surfaces to the exterior ambient atmosphere during peak loading of said power components.

3. A massive electrically powered travelling crane for use in an ambient atmosphere from which electrical power components must be sealed, comprising a crane bridge structure supported for lateral translation, a crane trolley structure supported by the bridge structure for tanslation therealong, said bridge structure comprising a hollow load supporting member constituted by walls having large surfaces exposed to the ambient atmosphere, the walls defining an internal chamber sealed from the atmosphere, and including a plurality of internal, spaced, stiffeners having openings therethrough, an electrical power component of high power capacity mounted on said bridge structure, said component having sealed housing means, duct means connecting the housing means and chamber, the housing means, chamber and connecting duct means defining a closed path of circulation, sealed from said atmosphere, through the housing means and chamber and back through the housing means, and gas moving means within said path of circulation for maintaining circulation of cooling gas therearound to cool said power component whereby said large surfaces constitute heat exchange surfaces between the cooling gas and the exterior ambient atmosphere, said surfaces being wiped by the mass of the exterior ambient atmosphere during the translation of said bridge structures thus increasing the rate of dissipation of heat through said surfaces to the exterior ambient atmosphere, whereby the physical size of said power component may be kept to a minimum size for its power capacity.

4. A crane as recited in claim 3, wherein the crane trolley structure comprises a hollow load supporting member constituted by walls having large surfaces exposed to the ambient atmosphere, said walls defining an interior chamber sealed from the atmosphere, and including a plurality of ribs acting as baffles and defining a serpentine path for the flow of cooling gas therethrough, an electrical power component of high power capacity mounted on said trolley structure, said latter component having sealed housing means, duct means connecting said housing means and chamber, the latter housing means, chamber and connecting duct means defining a closed path of circulation, sealed from the atmosphere, through the housing means and chamber and back through the housing means, and gas moving means within said latter path of circulation for maintaining circulation of cooling gas therearound to cool said latter power component whereby said large surfaces constitute heat exchange surfaces between the cooling gas and the exterior ambient atmosphere.

5. A crane as claimed in claim 3, wherein the electrical power component is located exteriorly of said internal chamber.

6. A crane as claimed in claim 5, including another electrical power component mounted on said bridge structure and located in said closed and sealed path and having gas moving means for forcing cooling gas around said path in the same direction as the first mentioned gas moving means circulates the gas.

References Cited in the file of this patent

UNITED STATES PATENTS

| | | |
|---|---|---|
| 928,640 | Douglas | July 20, 1909 |
| 953,574 | Amsler | Mar. 29, 1910 |
| 2,484,685 | Burdick et al. | Oct. 11, 1949 |
| 2,783,398 | Haas et al. | Feb. 26, 1957 |

FOREIGN PATENTS

| | | |
|---|---|---|
| 277,031 | Great Britain | Jan. 26, 1928 |